United States Patent
Domodossola et al.

(10) Patent No.: US 6,299,804 B1
(45) Date of Patent: Oct. 9, 2001

(54) AIR COOLING SYSTEM FOR PREFORM MOLDING

(75) Inventors: Robert Domodossola, Brampton; Steve Saggese, Bolton; Dan Stefan Vlaicu, Toronto; Tiemo D. Brand, North York, all of (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/397,984

(22) Filed: Sep. 16, 1999

(51) Int. Cl.$^7$ ................................................. B29C 45/72
(52) U.S. Cl. ....................... 264/37.17; 239/431; 264/237; 264/328.14; 425/526; 425/534; 425/535
(58) Field of Search ................................. 264/37.17, 237, 264/537, 538, 328.14, 336; 239/431; 425/526, 533, 534, 535, 547, 556, 557

(56) References Cited

U.S. PATENT DOCUMENTS

| | | | |
|---|---|---|---|
| 4,180,379 | * 12/1979 | Rainville | 264/538 |
| 4,449,913 | 5/1984 | Krishnakumar et al. | |
| 4,472,131 | 9/1984 | Ryder | |
| 5,232,641 | * 8/1993 | Williamson et al. | 264/328.14 |
| 5,232,715 | * 8/1993 | Fukai | 425/548 |
| 5,402,938 | * 4/1995 | Sweeney | 239/431 |
| 5,728,409 | 3/1998 | Schad et al. | |
| 5,750,162 | 5/1998 | Schad et al. | |
| 5,817,345 | 10/1998 | Koch et al. | |
| 5,830,404 | 11/1998 | Schad et al. | |
| 5,846,476 | * 12/1998 | Hwang et al. | 264/493 |
| 5,948,341 | * 9/1999 | Diamond et al. | 264/335 |
| 6,030,353 | * 2/2000 | Van Brunt | 239/431 |
| 6,139,789 | * 10/2000 | Neter et al. | 264/237 |
| 6,143,225 | * 11/2000 | Domodossola et al. | 264/336 |
| 6,171,541 | * 1/2001 | Neter et al. | 264/348 |

* cited by examiner

*Primary Examiner*—Jill L. Heitbrink
(74) *Attorney, Agent, or Firm*—Bachman & LaPointe, P.C.

(57) ABSTRACT

The present invention relates to an apparatus and a method of cooling molded preforms. The apparatus and method make advantageous use of air amplifiers to create a flow of cooling air over the molded preforms. In a first embodiment of the present invention, the air amplifiers are mounted to a part removal and cooling robot. In a second embodiment of the present invention, a plurality of air amplifier stations are positioned about an index block to cool the molded preforms. In a third embodiment of the present invention, a vacuuming system is provided to improve the adherence of the air flow created by the air amplifiers to the exterior surfaces of the molded preforms. In a fourth embodiment of the present invention, the air amplifiers are mounted to a movable plate and each amplifier has an internal bore sized to receive a molded preform to be cooled.

32 Claims, 8 Drawing Sheets

AIR COOLING SYSTEM FOR PREFORM MOLDING

BACKGROUND OF THE INVENTION

The present invention relates to an air cooling system to be used in connection with a preform molding machine which makes advantageous use of air amplifiers to cool the molded preforms and to a method of using same.

Index type injection molding machines with part cooling features at a variety of stations are shown in U.S. Pat. Nos. 5,728,409; 5,830,404; 5,750,162; and 5,817,345. The cooling of preforms on an index block using a part removal and cooling robot is shown in copending U.S. patent applications Ser. No. 09/167,699, filed Oct. 7, 1998, to Ing et al. entitled Cooling Device Attached to Index Machine; Ser. No. 09/215,819, filed Dec. 18, 1998, to Kutalowski entitled Cooling Device Attached to Index Machine; Ser. No. 09/261,880, filed Mar. 3, 1999, to Domodossola et al. entitled Turret Cooling Block for an Index Machine; and Ser. No. 09/263,393, filed Mar. 5, 1999, to Kozai et al. entitled Cooling Device Attached to Index Machine, all of which are assigned to the assignee of the instant patent application, and all of which are incorporated by reference herein. None of these patents and patent applications however teach the use of an air amplifier or applying different cooling conditions at different index block stations.

Cooling preforms by means of blowing air on their surfaces after the preform has been removed from a mold is shown in Japanese patent publication 7-171888 to Sumitomo. Further, U.S. Pat. No. 5,232,715 to Fukai teaches blowing air over the outside of a preform while it is held on a cooling mandrel. In both of these prior art examples, the preforms have been removed from the mold and are being cooled in a downstream piece of equipment. In order for the preforms to be removed from the mold without damage, sufficient cooling must take place in the mold to allow damage free ejection. Thus, a cycle time penalty has been accepted in order to do downstream cooling.

U.S. Pat. No. 4,449,913 to Krishnakumar shows blowing air over the outside of preforms while they are still on injection molding cores that are mounted on a turret block. The air blowing nozzles are at a fixed distance from the preforms. The Krishnakumar patent lacks any teaching of an air amplifier or how different cooling effects can be achieved at different areas of a preform surface.

SUMMARY OF THE INVENTION

Accordingly, it is an object of the present invention to provide an improved preform cooling apparatus and method.

It is a further object of the present invention to provide an improved preform cooling apparatus and method which has an improved ability to cool gate, body and neck areas of a preform.

It is still a further object of the present invention to provide an improved preform cooling apparatus and method which allows an earlier ejection from mold cores.

It is yet a further object of the present invention to provide an improved preform cooling apparatus and method which reduce crystallinity.

The foregoing objects are attained by the preform cooling apparatus and method of the present invention.

The present invention relates to an apparatus and a method of cooling molded preforms. The apparatus and method make advantageous use of air amplifiers to create a flow of cooling air over the molded preforms. In a first embodiment of the present invention, the air amplifiers are mounted to a part removal and cooling robot. In a second embodiment of the present invention, a plurality of air amplifier stations are positioned about an index block to cool the molded preforms. In a third embodiment of the present invention, a vacuuming system is provided to improve the adherence of the air flow created by the air amplifiers to the exterior surfaces of the molded preforms. In a fourth embodiment of the present invention, the air amplifiers are mounted to a movable plate and each amplifier has an internal bore sized to receive a molded preform to be cooled.

The method of the present invention broadly comprises forming a plurality of molded preforms having neck, body and gate areas on a set of mold cores, moving the molded preforms to a position remote from a molding station, and blowing cooling air over exterior surfaces of the molded preforms while the molded preforms are positioned on the mold cores. The blowing step comprises generating a flow of cooling air using at least one air amplifier.

Other details of the air cooling apparatus and method of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
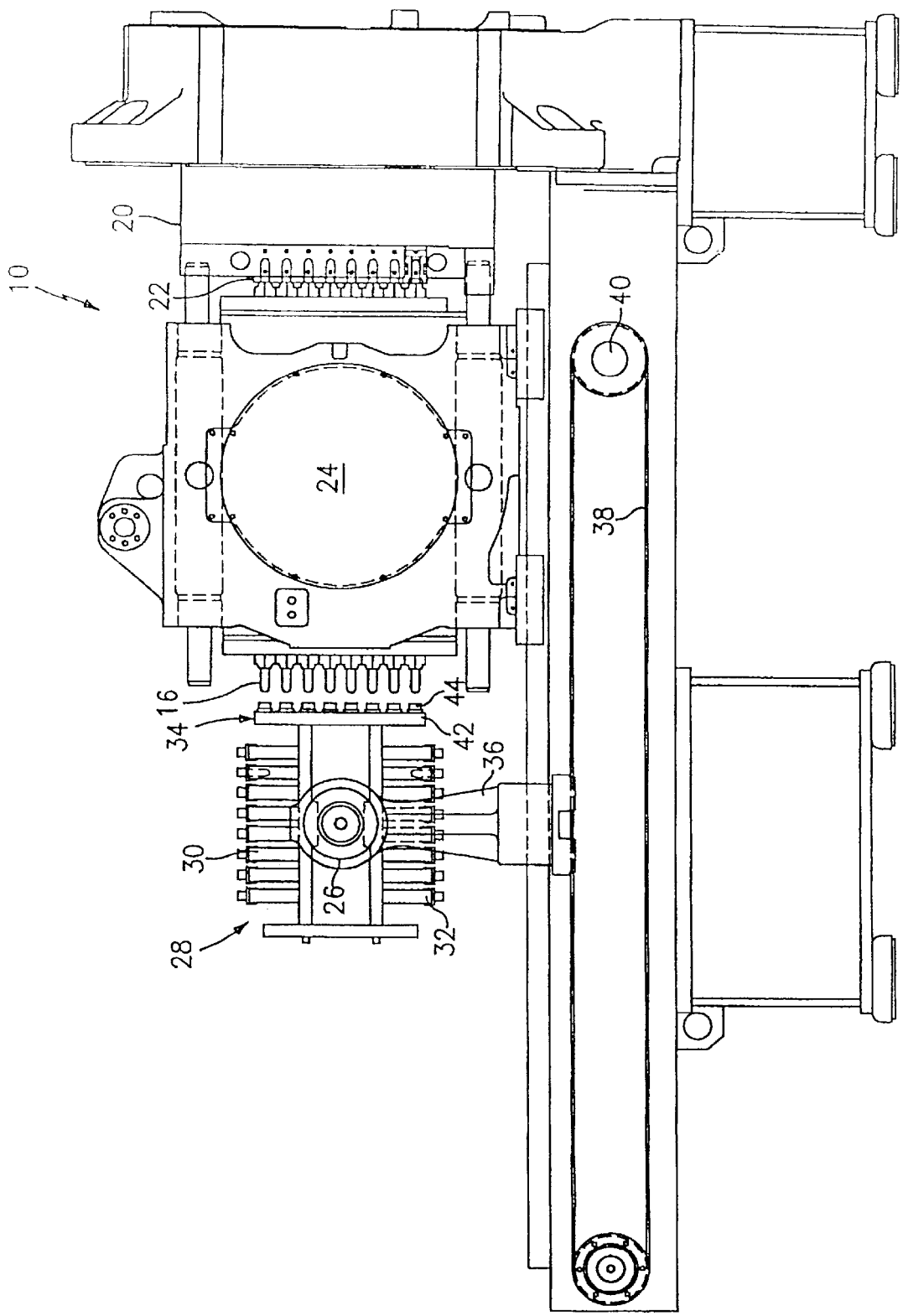
FIG. 1 is a side view of a clamp portion of an index style injection molding machine with an air amplifier installation combined with a part removal robot.

Referring now to the drawings, FIG. 1 shows an index style clamp portion of an injection molding machine 10 used for molding tubular articles or preforms 12, such as PET preforms weighing 28 grams having an average wall thickness in the body portion of 4.00 mm and molded from 9921W grade polyethylene terephthalate material.

The machine 10 is equipped with a 48 cavity hot runner mold 14 having four core sets 16, each mounted to one face 18 of a four faced index block 24. The mold 14 also includes a stationary mold half 20 which has a mold cavity half 22 which mates with one of the core sets 16 when the index block 24 has been moved into a mold closed position. When the machine 10 is in a mold closed configuration, molten plastic material to be molded is fed into the molds through the mold cavity half 22. The mechanism for introducing molten plastic material into the molds does not form part of the present invention and therefore has not been described in detail. Any suitable means known in the art for injecting plastic material into a mold may be utilized. Similarly, the mechanism for moving the index block 24 between mold closed and mold open positions and for rotating the block 24 does not form part of the present invention. Therefore, the moving and rotating mechanism(s) has not been described in detail. Any suitable moving and rotating mechanism(s) known in the art may be utilized.

After each injection cycle and the opening of the mold 14, the block 24 is rotated 90 degrees counterclockwise so that the molded preforms 12 remain on the mold cores 16 until removal. If desired, each of the mold cores 16 may be cooled using any suitable cooling means known in the art. After the formation of a second batch of preforms 12, a first batch of the molded preforms face a part removal and cooling robot 28. The cycle time for each block rotation is approximately 15 seconds during which time the preforms 12 on the mold cores 16 facing the part removal and cooling robot 28 are subjected to supplementary cooling from ambient or chilled air blown over their outer surfaces. Following this supplementary cooling, the preforms 12 are ejected from the mold cores 16 into the cooled part removal tubes 30 or 32 for additional cooling if necessary. Any suitable means known in the art may be used to eject the cooled preforms 12 from the mold cores 16. Since the ejection mechanism does not form part of the present invention, it has not been described in detail.

In accordance with the present invention, the part removal and cooling robot 28 includes an air amplifier station 34 for cooling the preforms 12 while they are on the mold cores 16. A rotary head 26 moves either of the removal tube sets 30 and 32 or the air amplifier station 34 into alignment with the set of preforms 12 while they are on their respective mold cores 16. As can be seen in FIG. 1, the part removal and cooling robot 28 is mounted on a movable carriage 36 connected by a continuous belt 38 to an electric linear drive 40 such that the movable carriage 36, and hence the robot 28, can be moved toward and away from the index block 24 so that the distance between either the air amplifier station 34 or either of the part removal tubes 30 or 32 and the corresponding preforms 12 can be varied.

The air amplifier station 34 comprises a mounting plate 42 on which are mounted a plurality of air amplifiers 44, such as EXAIR Super Air Amplifiers. Each amplifier 44 is positioned so as to correspond with a respective opposed mold core 16 and is aligned such that a cooling fluid, i.e. ambient or chilled air, can be directed from the amplifier 44 toward the preform 12 resting on the mold core 16. In a preferred embodiment, the number of air amplifiers 44 equals the number of molded preforms 12.

Figure 2:
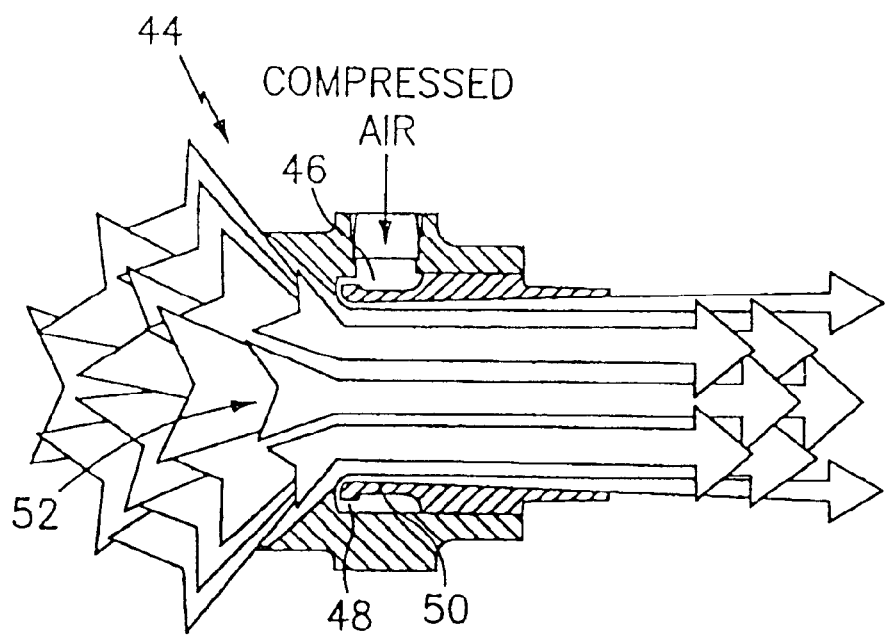
FIG. 2 is a schematic explanation of the operation of an air amplifier.

FIG. 2 illustrates how the air amplifier 44 works in principle. As shown therein, compressed air enters into an annulus 46 where it is throttled out through a gap 48. The stream of air adheres to the Coanda effect as it follows the profile 50 of the outlet nozzle. The fast flowing air creates a pressure drop at an inlet 52 where surrounding air is sucked in, increasing the total air flow. EXAIR amplifiers come equipped with shims (not shown) which are used to create the previously described air jets. The thickness of a shim affects the velocity of the jets as they increase the velocity of the primary flowing air.

As shown in FIG. 1, the preforms 12 in a batch are first cooled using the air amplifiers 44. After cooling has been completed, the robot 28 is rotated so that one of the sets of cooling tubes 30 or 32 is aligned with the cooled preforms 12. The robot 28 is then moved toward the index block 24 so that the cooled preforms 12 are ejected into the cooling tubes 30 or 32. The robot is then moved back away from the index block 24 and rotated so as to bring the air amplifier station 34 into position for the next cooling cycle.

After the preforms 12 have been further cooled within the cooling tubes 30 or 32, they are ejected from the cooling tubes 30 or 32. Any suitable means known in the art may be used to eject the cooled preforms 12 from the cooling tubes 30 and 32.

It has been found that air amplifiers, such as the EXAIR air amplifiers, are eminently suitable for an application where a relatively small supply of high pressure air is to be used to move a large mass of surrounding air through an amplifier nozzle to perform cooling. It has also been found that the velocity and corresponding air flow rate through such an amplifier can be adjusted to provide a desired level of cooling.

Figure 3:
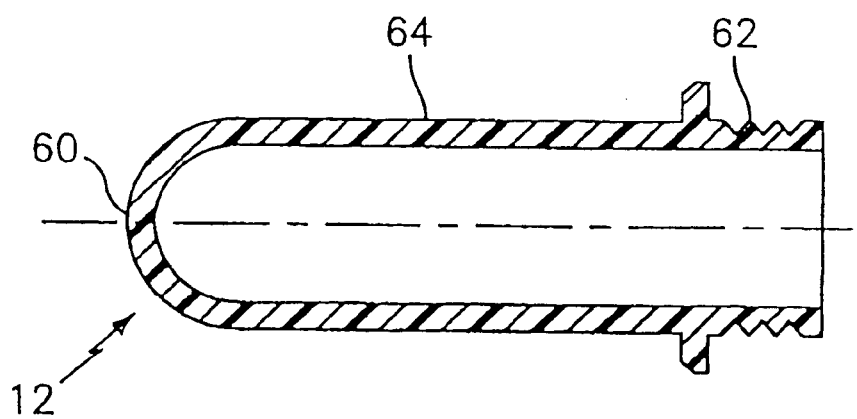
FIG. 3 is a schematic view of a preform.

It has been found that the rate of cooling of molded preforms 12 is significantly enhanced when air amplifiers are used to cool them. Table I shows measured cooling data achieved using the cooling system of the present invention. Surface temperature of the preforms 12 were measured in three regions which are shown in FIG. 3. The three regions include the gate area 60, the neck area 62, and the preform body 64. Each air amplifier 44 is typically closest to the gate area 60 and furthest from the neck area 62. Various air pressures, flow velocities (set by using different thickness shims) and distances between the air amplifier and the preform were measured and are shown in Table I.

TABLE I

| Responses | | | | | | | |
|---|---|---|---|---|---|---|---|
| | | Shim | Factors | | | | |
| Air Pressure | Dis- tance | Thick- ness | Thermal Decay Rates (° C./s) | | | Air Comsump. | Air Amp. |
| (psi) | (mm) | (in) | Neck | Body | Gate | (cfm) | (cfm) |
| 30 | 30 | 0.001 | −1.6397 | −1.5856 | −1.6551 | 0.42 | 10.56 |
| | | 0.0015 | −1.7409 | −1.6434 | −1.6551 | 1.30 | 12.90 |
| | | 0.002 | −1.8185 | −1.7013 | −1.6551 | 2.18 | 15.25 |
| | 80 | 0.001 | −1.6003 | −1.5856 | −1.6781 | 0.42 | 10.56 |
| | | 0.0015 | −1.6779 | −1.5435 | −1.6781 | 1.30 | 12.90 |
| | | 0.002 | −1.7556 | −1.7013 | −1.6781 | 2.18 | 15.25 |
| | 130 | 0.001 | −1.5610 | −1.5856 | −1.7011 | 0.42 | 10.56 |
| | | 0.0015 | −1.6386 | −1.6434 | −1.7011 | 1.30 | 12.90 |
| | | 0.002 | −1.7162 | −1.7013 | −1.7011 | 2.18 | 15.25 |
| 45 | 30 | 0.001 | −1.6937 | −1.6355 | −1.7316 | 0.66 | 13.93 |
| | | 0.0015 | −1.7713 | −1.6934 | −1.7316 | 1.54 | 16.27 |
| | | 0.002 | −1.8489 | −1.7512 | −1.7316 | 2.42 | 18.62 |
| | 80 | 0.001 | −1.6544 | −1.6355 | −1.7547 | 2.33 | 13.93 |
| | | 0.0015 | −1.7320 | −1.6934 | −1.7547 | 1.54 | 16.27 |
| | | 0.002 | −1.8096 | −1.7512 | −1.7547 | 2.42 | 18.62 |
| | 130 | 0.001 | −1.6150 | −1.6355 | −1.7777 | 0.66 | 13.93 |
| | | 0.0015 | −1.6926 | −1.6934 | −1.7777 | 1.54 | 16.27 |
| | | 0.002 | −1.7702 | −1.7512 | −1.7777 | 2.42 | 18.62 |
| 60 | 30 | 0.001 | −1.7477 | −1.6855 | −1.7188 | 1.71 | 17.30 |
| | | 0.0015 | −1.8254 | −1.7433 | −1.7188 | 2.58 | 19.65 |
| | | 0.002 | −1.9030 | −1.8012 | −1.7188 | 3.46 | 21.99 |
| | 80 | 0.001 | −1.7084 | −1.6855 | −1.7419 | 1.71 | 17.30 |
| | | 0.0015 | −1.7860 | −1.7433 | −1.7419 | 2.58 | 19.65 |
| | | 0.002 | −1.8636 | −1.8012 | −1.7419 | 3.46 | 21.99 |
| | 130 | 0.001 | −1.6690 | −1.6855 | −1.7649 | 1.71 | 17.30 |
| | | 0.0015 | −1.7467 | −1.7433 | −1.7649 | 2.58 | 19.65 |
| | | 0.002 | −1.8243 | −1.8012 | −1.7649 | 3.46 | 21.99 |

During the tests that were performed, the neck area 62 of the preforms 12 remained enclosed by the corresponding mold inserts that are used for forming its shape. Consequently, this area of the preform is not exposed for air amplifier cooling. Despite this, the data relating to the neck area cooling rate is presented because it was surprisingly found that there is some enhancement of the cooling rate of the neck area due to the air cooling of the adjacent body portion 64 of the preform 12.

Figure 4A:
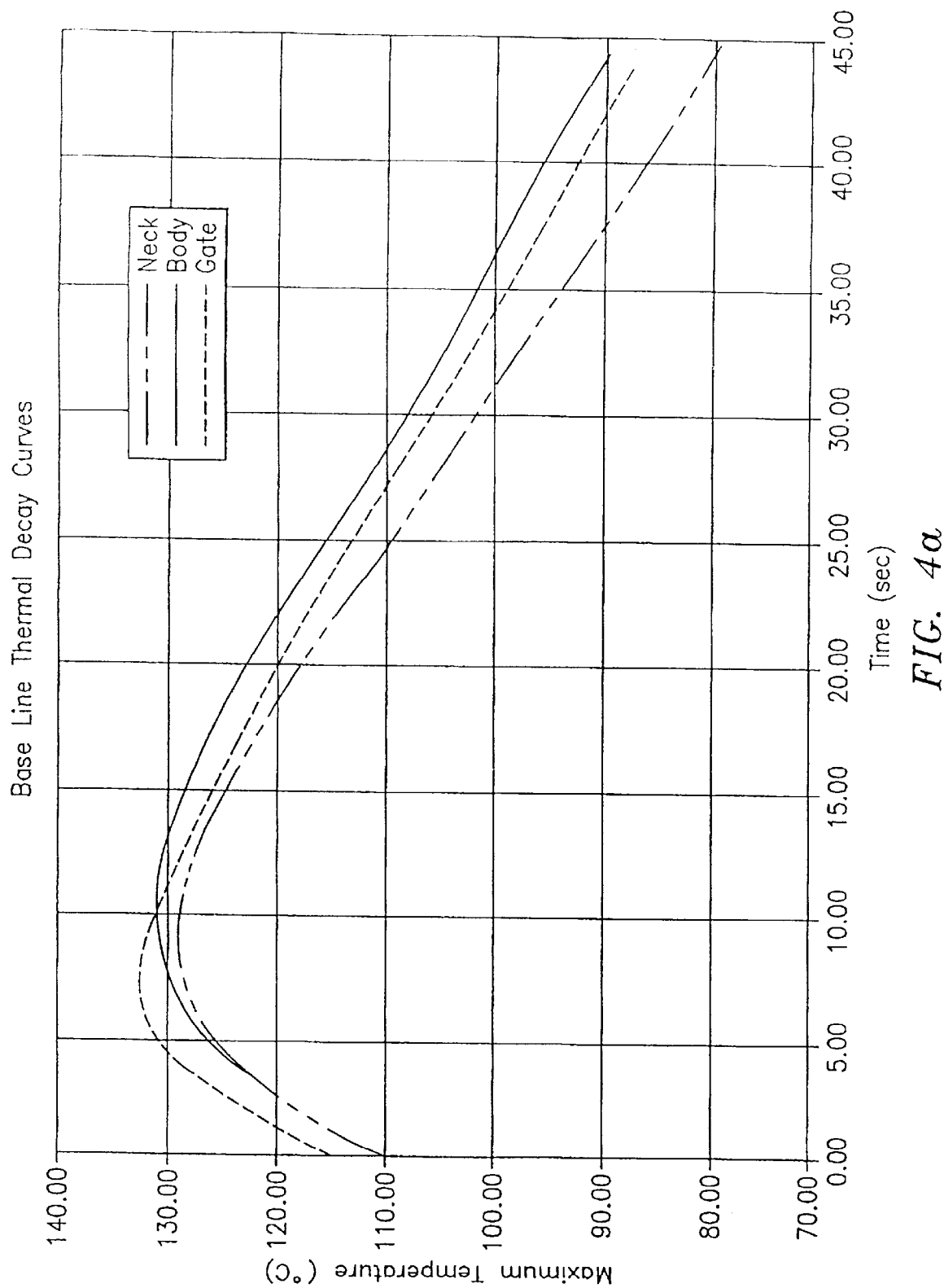
FIG. 4a is a graphical representation of a thermal decay baseline data.

FIG. 4a is a graph showing a typical cooling rate (thermal decay) in the gate, neck and body portions of a preform 12 on a core without the benefit of an air amplifier. The characteristic rising surface temperature of the preform of about 20° C. for up to 10 seconds is seen from this figure. Further, a residual surface temperature of about 90° C. for the body portion 64 can be seen after 45 seconds.

Figure 4B:
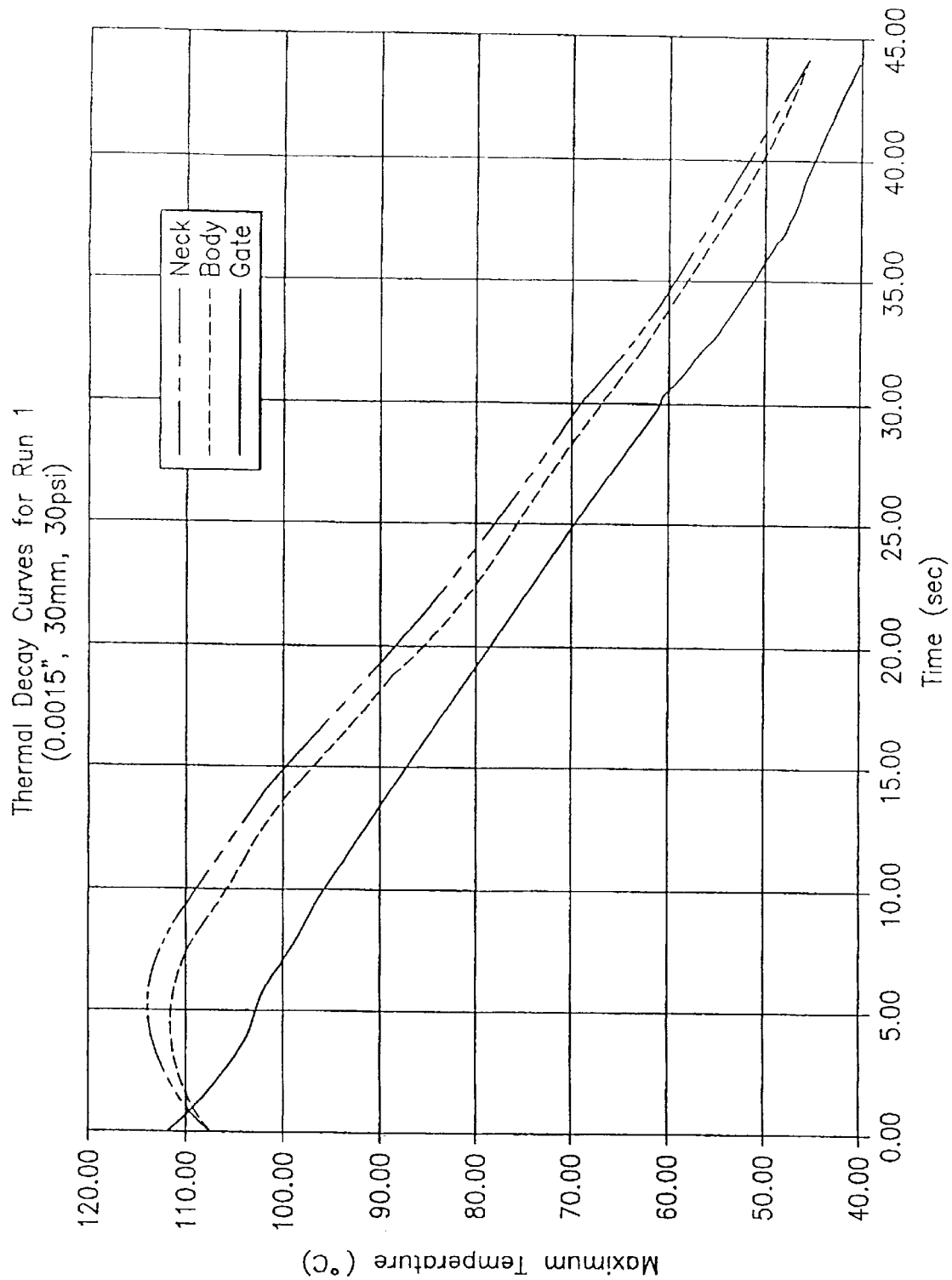
FIG. 4b is a graphical representation of thermal decay profile achieved using the apparatus of the present invention.

FIG. 4b is a graph showing the cooling rate which can be achieved using the cooling system of the present invention. This figure shows an improved cooling rate for the same preforms on the cores. As can be seen from the figure, the characteristic surface temperature rise is severely curtailed to less than 5° C. for only 5 seconds and after 45 seconds, the surface temperature of the body portion 64 is down to approximately 45° C., which represents an almost 100% improvement.

One of the benefits of enhanced cooling is reduced crystallinity, which is caused when the preforms' reheating is minimized. A second benefit from the enhanced cooling being applied directly to the preforms' outer surface is that because these surfaces harden faster this allows an earlier ejection from the cores. The ejection timing is typically limited by the ability of the preforms' outer surface to resist damage due to scuffing and the like, which can occur if the parts are ejected when the surface is still relatively soft. The enhanced air amplifier cooling reduces the time taken for the parts to reach a safe ejection temperature, thereby improving the overall molding cycle time.

It has been found that positioning the air amplifiers 44 at different distances from the preforms affects the rate of surface cooling differently in the three regions studied—the gate area 60, the neck area 62, and the body 64. If only one air amplifier cooling station is employed, the distance between the air amplifier and the preforms is compromised to try to optimize the cooling in all of the three areas. However, if multiple air amplifiers are used at different index block stations each can be optimized to maximize the cooling at one of these specific areas, thereby improving the overall cooling efficiency of the system. Such a system is shown in FIG. 5.

Figure 5:
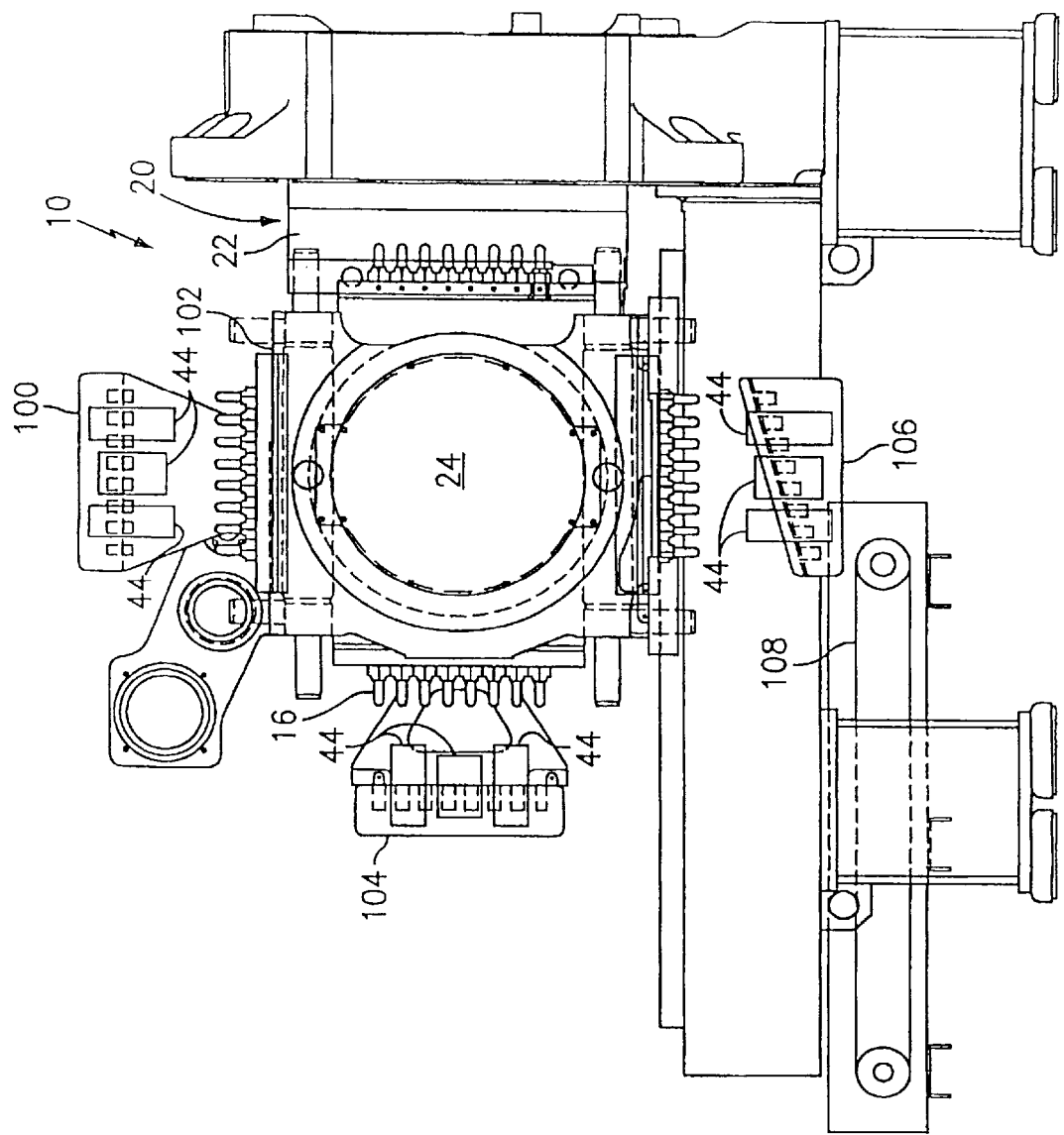
FIG. 5 is a side view of the clamp portion of an index style injection molding machine with multiple air amplifier installations.

Referring now to FIG. 5, the side of the clamp portion of an index style injection molding machine 10 is shown. As can be seen from this figure, three air amplifier stations 100, 104 and 106 are installed. The first or top station 100 is mounted on or to the top surface of the index block carriage 102. The station 100 can be moved toward and away from the preforms 12 by any suitable drive system (not shown) known in the art. The second or rear station 104 is mounted on or to the back surface of the index block carriage 102 and can be similarly moved toward and away from the preforms 12. Any suitable means (not shown) known in the art may be used to move the rear station 104 towards and away from the preforms 12. The third or bottom station 106 is mounted underneath the index block carriage 102 and also can be moved toward and away from the preforms 12. Again, any suitable means (not shown) known in the art may be used to move the bottom station towards and away from the preforms 12. The third station also may serve to unload the preforms 12 depositing them on conveyor 108. Any suitable means known in the art may be incorporated into the station 106 to unload the preforms 12 and deposit them onto the conveyor 108.

As can be seen from FIG. 5, each of the stations 100, 104, and 106 includes a plurality of air amplifiers 44. In a preferred embodiment, each of the stations 100, 104, and 106 has a number of air amplifiers 44 equal to the number of molded preforms being cooled.

One set up for the configuration of FIG. 5 is to use the top station 100 to direct cooling air from the air amplifiers 44 at the gate area 60 of the preforms 12 to prevent gate crystallinity, the location where it is most prevalent. When the preforms 12 are positioned opposite the station 100, the bulk of thermal energy in the preforms' body wall and neck areas has not migrated from mid-wall thickness to the surfaces and so a limited amount of cooling fluid is directed in these areas. At the rear and bottom stations 104 and 106 respectively, most of the cooling air generated by the air amplifiers 44 is directed toward the body and neck areas 64 and 62 respectively, of the preforms 12 to remove the bulk of the preforms' thermal energy which has migrated to the surface by then.

In addition to directing the cooling fluid to specific areas of the preform surface, varying the amount of cooling fluid can also be employed to more efficiently use the supply. At the top station 100, less air is needed for gate area cooling compared to the rear and bottom stations 104 and 106 where higher air flow rates are employed to remove the larger heat energy levels.

Figure 6:
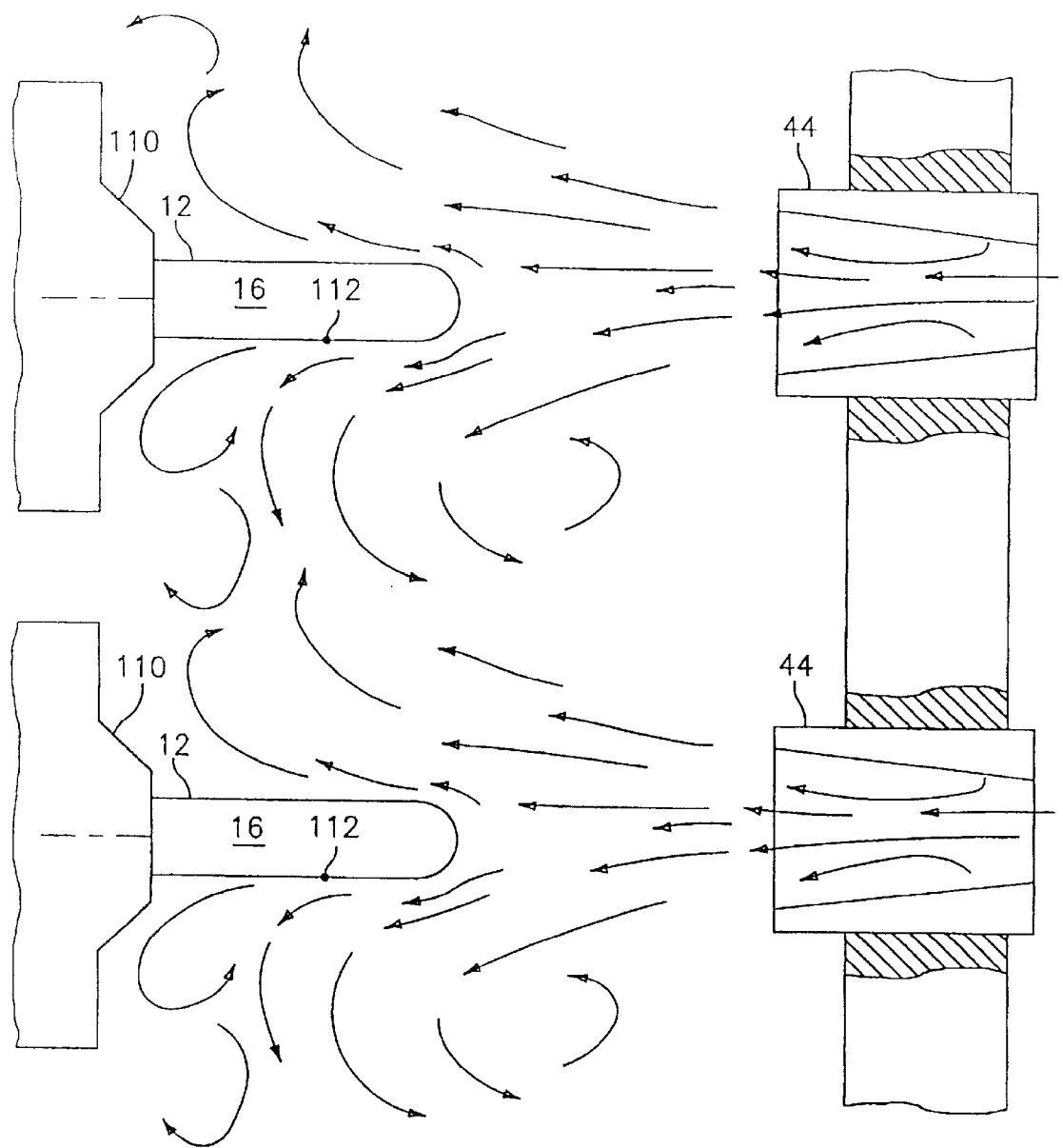
FIG. 6 is a schematic view of air flow from an air amplifier in an embodiment in accordance with the present invention.

FIG. 6 shows how the air flow moves over preform surfaces. Because each preform 12 is positioned on an injection mold core 16, which itself is mounted on a mold structure such as the index block 24, the air flow moving over the preform surface eventually encounters the mold surface 110 which causes the air flow to change direction. There is no provision in the mold to allow air to flow through its structure. So, with its path blocked, the air flow must change direction and move away from the preforms 12. The point at which the air moves away from a preform 12 is known as the separation point. Such separation points 112 are show in FIG. 6. The occurrence of a separation point 112 at some point along the preform body reduces the effectiveness of the air cooling the preform surface adjacent the neck end 62 of the preform body.

Figure 7:
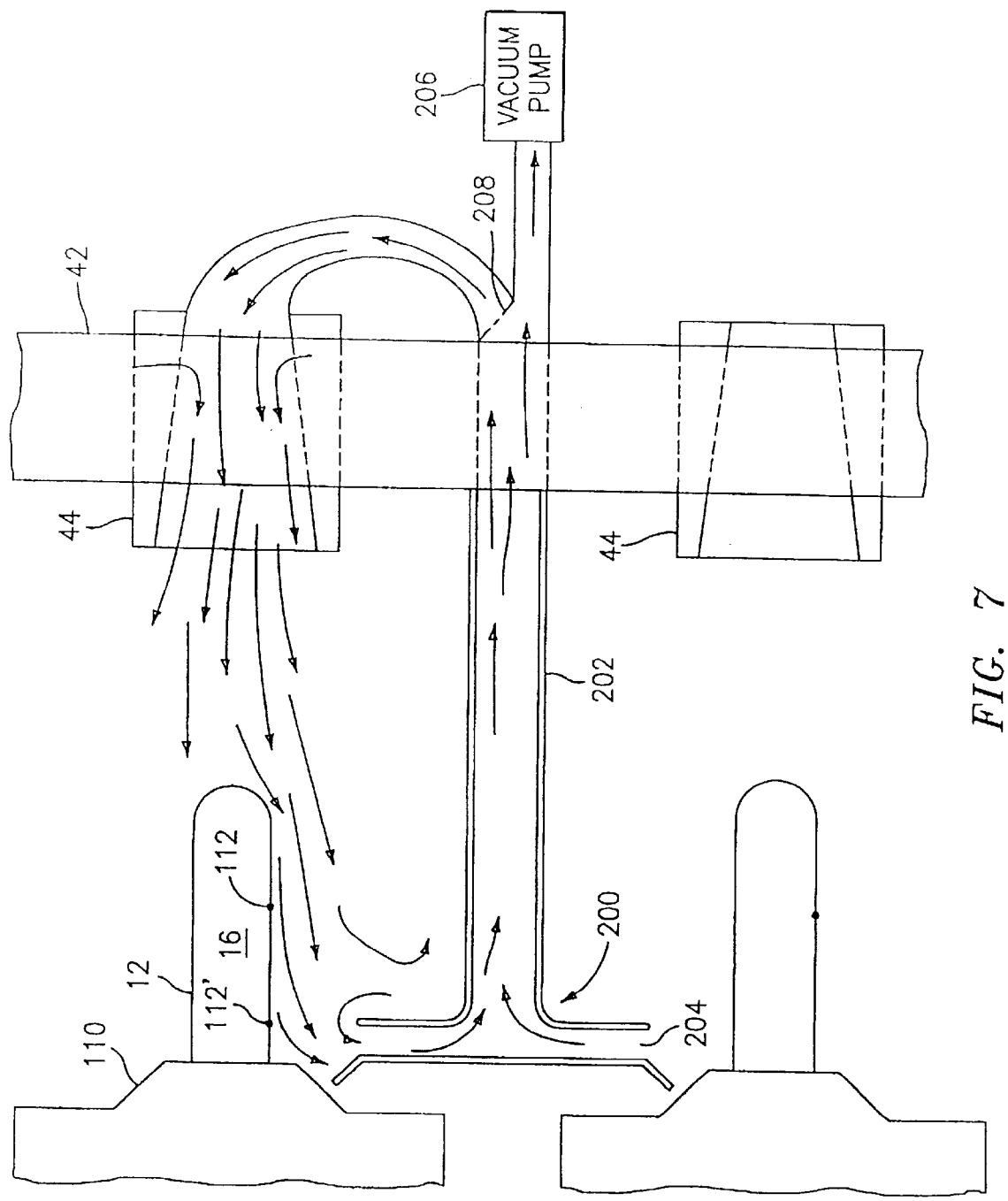
FIG. 7 is a schematic view of an alternative embodiment of a preform cooling system in accordance with the present invention.

FIG. 7 shows an alternative embodiment of a cooling system in accordance with the present invention. In this embodiment, an air removal attachment 200 is mounted to the air amplifier carrier plate 42. The air removal attachment 200 comprises a conduit 202 connected to the carrier plate 42. The conduit 202 has an inlet 204 adjacent the mold surface 110. The conduit 202 is connected to a vacuum source 206, such as a vacuum pump, so as to vacuum air away from the mold surface 110 and thereby allow the cooling stream of air emitting from the air amplifier(s) 44 to reach further along the body of the preform 12 before separating from its surface. Note in FIG. 7 that the separation point 112 has moved closer to the mold surface 110 (new separation point 112'). If desired, a valve 208 may be incorporated into the conduit 202 to divert some of the vacuumed air to the air amplifier(s) 44. This recirculation feature allows the air amplifier(s) 44 to optimize the supply of air.

Figure 8:
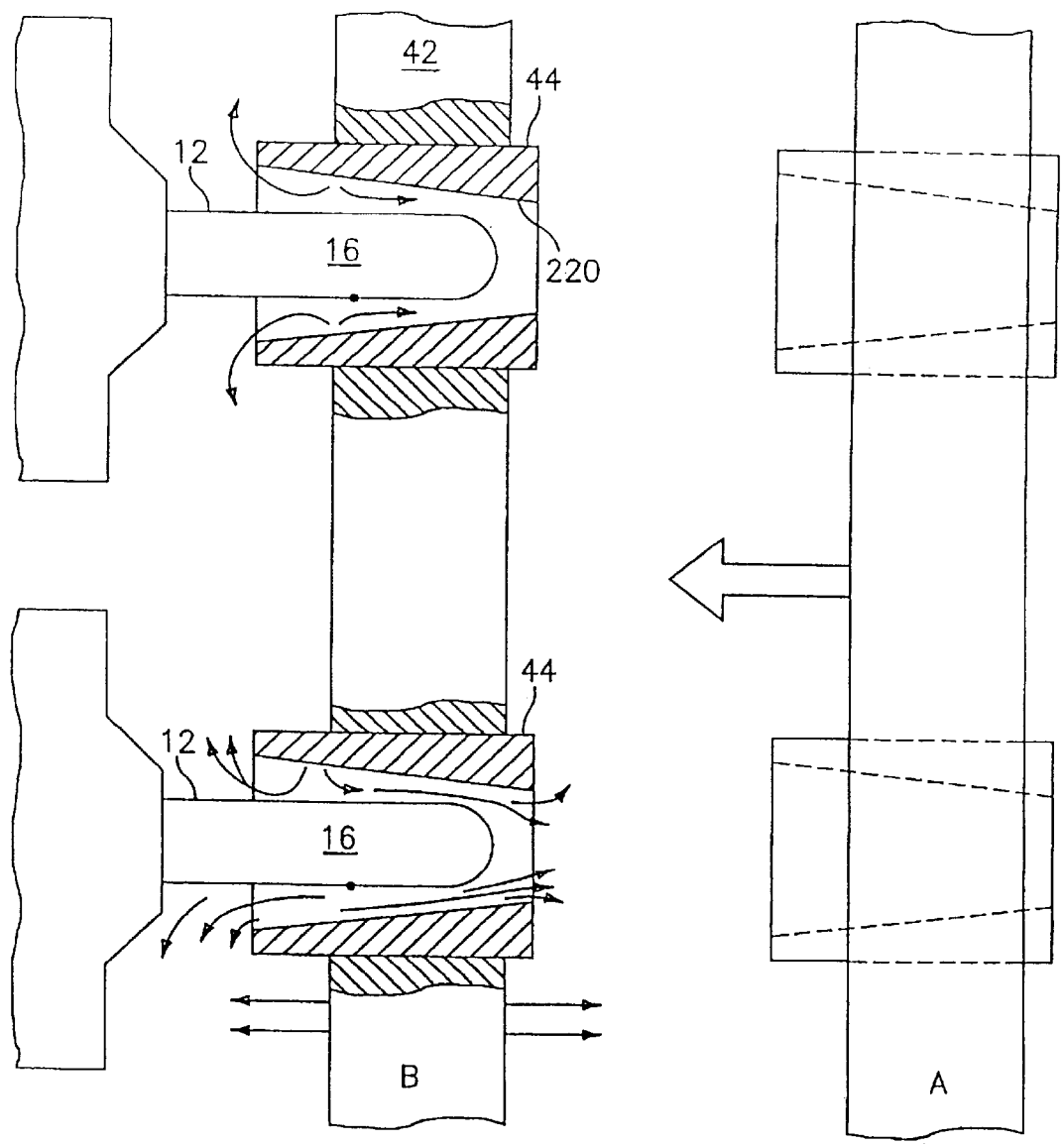
FIG. 8 is a schematic view of another alternative embodiment of a preform cooling system in accordance with the present invention.

FIG. 8 shows yet another alternative embodiment of a cooling system in accordance with the present invention. In this embodiment, each air amplifier 44 is provided with an internal bore 220 having a sufficient internal diameter to allow the air amplifier to pass over a preform 12 being cooled. Each air amplifier 44 is mounted on a movable plate 42' and moved over the length of the preform 12 so that its cooling air is directed onto the preform's surface during the travel of the movable plate 42'. By adjusting the air amplifier internal diameter to suit the various preform external diameters that may be molded, the cooling efficiency of the air stream can be fully optimized over the length of the preform surface. Any suitable means (not shown) known in the art may be used to move the plate 42', and hence the air amplifiers 44, from a fully retracted position A to a position B where the air amplifiers 44 are positioned over the preforms 12.

Using the cooling systems of the present invention, differently shaped preforms having greater or less resin mass in various shapes can be accommodated by adjusting the cooling profile of the multiple air amplifier installations.

While the air amplifier cooling technique of the present invention has been disclosed using an index style injection molding machine platform, it is also feasible for the technique to be used by mounting it on a conventional robot tooling plate that removes parts from a mold and handles them for post mold cooling operations. Furthermore, the technique can be applied downstream of a robot removal device by incorporating it in downstream cooling equipment.

It is apparent that there has been provided in accordance with the present invention air cooling systems for preform molding which fully satisfy the objects, means and advantages set forth hereinbefore. While the present invention has been described in the context of specific embodiment thereof. Other variations, alternatives and modifications will become apparent to those skilled in the art after reading the instant description. Therefore, it is intended to embrace such variations, alternatives, and modifications as fall within the broad scope of the appended claims.

What is claimed is:

1. A method for cooling molded preforms comprising the steps of:
   forming a plurality of molded preforms having neck, body and gate areas on a set of mold cores;
   moving said molded preforms to a position remote from a molding station; and
   blowing cooling air over exterior surfaces of said molded preforms while said molded preforms are positioned on said mold cores; and
   said blowing step comprising generating a flow of cooling air using at least one air amplifier which uses a flow of high pressure air to draw a flow of lower pressure air.

2. A method according to claim 1, wherein said blowing step comprises generating a flow of cooling air using a plurality of air amplifiers positioned adjacent said molded preforms.

3. A method according to claim 1, further comprising:
   providing a part removal and cooling robot adjacent said remote position, said robot having at least one set of cooling tubes and having said at least one air amplifier positioned on a surface perpendicular to said at least one set of cooling tubes; and
   rotating said robot between a first position where said at least one air amplifier is aligned with said molded preforms and a second position where said at least one set of cooling tubes is aligned with said molded preforms.

4. A method according to claim 3, further comprising ejecting molded preforms from said mold cores into said at least one set of cooling tubes when said robot is in said second position.

5. A method according to claim 1, further comprising:
   said moving step comprising providing a rotary index block and rotating said index block relative to said molding station;
   positioning a first air amplification station containing at least one air amplifier above said index block; and
   said blowing step comprising generating a first flow of cooling air using said at least one air amplifier above said index block and directing said flow of cooling air toward said gate area of each said preform when said molded preforms are positioned opposite said first air amplification station.

6. A method according to claim 5, further comprising:
   positioning a second air amplification station containing at least one air amplifier adjacent a rear surface of said index block; and
   said blowing step comprises generating a second flow of cooling air using said at least one air amplifier adjacent the rear surface of said index block and directing said flow of cooling air toward said body and neck areas of each said preform when said preforms are in a position opposite said second air amplification station.

7. A method according to claim 6, further comprising:
   positioning a third air amplification station containing at least one air amplifier underneath said index block; and
   said blowing step comprises generating a third flow of cooling air using said at least one air amplifier underneath said index block and directing said flow of cooling air toward said body and neck areas of each said preform when said preforms are in a position opposite said third air amplification station.

8. A method according to claim 7, wherein said second and third air flows are each greater than said first air flow.

9. A method according to claim 1, further comprising:
   said mold cores being positioned adjacent a mold surface; and
   vacuuming said flow of cooling air adjacent said mold surface so as to cause said air contacting said exterior surfaces of said molded preforms to adhere to said exterior surfaces for a longer time.

10. A method according to claim 1, further comprising:
    said blowing step comprising generating a flow of cooling air about each said molded preform using a plurality of air amplifiers; and
    moving each of said air amplifiers over a respective one of said molded preforms.

11. A method according to claim 10, wherein said moving step comprises moving each of said molded preforms into a bore in a respective one of said air amplifiers.

12. An apparatus for cooling molded preforms, said apparatus comprising:
    means for forming said molded preforms;
    said forming means including a plurality of mold cores;
    means for blowing cooling air over exterior surfaces of said molded preforms while said molded preforms are positioned on said mold cores; and
    said blowing means comprising an air amplifier station positioned opposite said molded preforms, said air amplifier station having means for creating an increased flow of cooling air by using a flow of high pressure air to draw a flow of lower pressure air.

13. An apparatus according to claim 12, wherein said air amplifier station comprises a plate and said increased flow creating means comprising a plurality of air amplifiers mounted to said plate.

14. An apparatus according to claim 13, further comprising a part removal and cooling robot and said plate being mounted to said robot.

15. An apparatus according to claim 14, further comprising said robot having at least one set of cooling tubes and being rotatable to move said air amplifier station away from said molded preforms and to move said cooling tubes into position adjacent said molded preforms.

16. An apparatus according to claim 14, further comprising:

said robot having two sets of cooling tubes;

said plate being positioned between said two set of cooling tubes; and said robot being rotatable to move said air amplifier station away from said molded preforms and to move one of said sets of cooling tubes into a position adjacent said molded preforms.

17. An apparatus according to claim 13, wherein the number of air amplifiers mounted to said plate are equal in number to the number of molded preforms.

18. An apparatus according to claim 12, wherein said preform forming means includes a rotary index block movable between a mold closed position and a mold open position and a plurality of sets of said mold cores being mounted on faces of said rotary index block.

19. An apparatus according to claim 18, wherein said air amplifier station is positioned adjacent a rear face of said rotary index block.

20. An apparatus according to claim 18, further comprising three air amplifier stations positioned around said rotary index block so as to cool multiple sets of molded preforms simultaneously.

21. An apparatus according to claim 20, wherein said three amplifier stations comprise a first amplifier station positioned above said rotary index block, a second amplifier station positioned adjacent a rear face of said rotary index block, and a third amplifier station positioned underneath said rotary index block.

22. An apparatus according to claim 21, further comprising an index block carriage and each of said amplifier stations being mounted to said index block carriage.

23. An apparatus according to claim 21, further comprising each of said amplifier stations having a plurality of air amplifiers forming said increased flow creating means.

24. An apparatus according to claim 21, further comprising each of said preforms having a gate area and said first amplifier station having at least one air amplifier forming said increased flow creating means directed to cause cooling air to flow over said gate area of each said preform so as prevent gate crystallinity.

25. An apparatus according to claim 21, further comprising each of said preforms having a neck area and a body area and each of said second and third air amplifier stations having air amplifiers forming said increased flow creating means directed at the body and neck areas of said preforms to remove the bulk of the thermal energy of said preforms.

26. An apparatus according to claim 21, wherein said second and third air amplifier stations direct more cooling air at said preforms than said first air amplifier station.

27. An apparatus according to claim 12, further comprising:

said plurality of mold cores being mounted to a mold surface which disturbs air flow about said molded preforms on said mold cores and creates an air flow separation point; and means for causing said air flow to be less disturbed by said mold surface and for causing said air flow separation point to move closer to said mold surface.

28. An apparatus according to claim 27, further comprising:

said air amplifier station being mounted to a carrier plate and having at least one air amplifier forming said increased flow creating means;

said air flow causing means comprising at least one conduit mounted to said carrier plate; and each said conduit having an air inlet adjacent said mold surface and being connected to a vacuum source.

29. An apparatus according to claim 28, further comprising means for recirculating a portion of said air within said conduit to said at least one air amplifier.

30. An apparatus according to claim 28, further comprising a plurality of air amplifiers mounted to said plate and a conduit associated with each of said air amplifiers.

31. An apparatus according to claim 12, wherein said air amplifier station has a plurality of amplifiers forming said increased flow creating means and each of said air amplifiers has a bore with an internal diameter sufficient to fit over exterior surfaces of one of said molded preforms.

32. An apparatus according to claim 31, further comprising said air amplifier station having a carrier plate to which said amplifiers are mounted and said carrier plate being movable between a first position where said air amplifiers are spaced from said preforms and a second position where said air amplifiers are spaced over said preforms.

* * * * *